United States Patent [19]

Manduley et al.

[11] Patent Number: 4,649,490

[45] Date of Patent: Mar. 10, 1987

[54] SCALE WITH PROCESSOR CONTROLLED POWER SWITCHING

[75] Inventors: Flavio Manduley, Woodbury; Edwin G. Grisgraber, Huntington, both of Conn.

[73] Assignee: Pitney Bowes Inc., Stamford, Conn.

[21] Appl. No.: 684,410

[22] Filed: Dec. 20, 1984

[51] Int. Cl.⁴ .............................................. G06F 15/20
[52] U.S. Cl. ................................... 364/466; 177/25; 364/900
[58] Field of Search ........ 364/464, 466, 200 MS File, 364/900 MS File; 177/4, 25; 323/383, 267

[56] References Cited

U.S. PATENT DOCUMENTS

| | | | |
|---|---|---|---|
| 4,180,856 | 12/1979 | Check, Jr. et al. | 364/466 |
| 4,430,716 | 2/1984 | Dlugos et al. | 364/466 |
| 4,472,781 | 9/1984 | Miller | 364/466 |
| 4,574,352 | 3/1986 | Coppola et al. | 364/466 |
| 4,578,758 | 3/1986 | Muller | 364/466 |

*Primary Examiner*—Errol A. Krass
*Assistant Examiner*—H. R. Herndon

*Attorney, Agent, or Firm*—Robert H. Whisker; Melvin J. Scolnick; David E. Pitchenik

[57] ABSTRACT

A computation and control module suitable for use in a variety of postal scales as well as other types of mailroom equipment is disclosed. The module includes a microprocessor and associated circuitry; connectors for connecting ROM, which store firmware for controlling the microprocessor, and PROM, which store postal rate charts; an input/output connector; a serial interface for communications with postage meters; a non-volatile memory for storing parameters specific to particular units; and an auxiliary input/output connector. The auxiliary input/output connector is driven by selected, memory mapped interface circuitry mounted on the PROM card. The module also includes a load cell interface and a power supply. In one embodiment switches, responsive to the microprocessor, are provided for sequentially energizing various connectors and interfaces, so as to reduce power requirements. Systems comprising a plurality of computation and control modules are disclosed. Other systems including battery powered modules mechanically and electrically interconnected by a power distribution bus are also disclosed, as a modular power bus.

13 Claims, 5 Drawing Figures

SCALE WITH PROCESSOR CONTROLLED POWER SWITCHING

BACKGROUND OF THE INVENTION

Postal scale are well known in the art; simple spring scales with scale charts which map a weight range into one or more postal rates having existed for decades. More recently, with the increased availability of solid state microprocessors, load cells and low-cost analog-to-digital (A/D) converters it has become feasible to provide electronic, digital postal scales with greatly increased capabilities. These increased capabilities have not been without price however, and part of this price has been an increasing demand placed on scale power supplies as capabilities were expanded. This problem is further aggravated by any attempt to increase the commonality of components used in a family of scales and other mailroom products; as disclosed in the commonly assigned U.S. patent application entitled, General Purpose Processor Module Mailroom Equipment, by Flavio Manduley, filed Dec. 20, 1984, Ser. No. 684,411 since clearly any common power supply must be capable of meeting the greatest peak demand in its product family.

Thus, it is an object of the subject invention to provide an electronic scale having reduced peak power demands.

It is another object of the subject invention to provide an electronic postal scale of modular design which may be expanded to an increased capacity without an increase in the size of the power supply provided.

Other objects and advantages will be readily apparent to those skilled in the art from consideration of the detailed description set forth below and of the attached drawings.

BRIEF SUMMARY OF THE INVENTION

The above objects are achieved and the disadvantages of the prior art are overcome in accordance with the subject invention by means of a scale comprising; a processing unit for controlling the operation of the scale and for computing appropriate postage values for an item to be mailed according to its weight and the desired postal services as specified by information entered by an operator; an input for transmission of the information to the processor; and weighing apparatus for determining the weight of the item, converting the weight to digital form, and transmitting the digital weight to the processor. The scale also includes a power supply for providing power to the processing unit, the input, and the weighing apparatus. The power supply is connected to the input and the weighing apparatus through processor controlled switches for selectively connecting and disconnecting the input and the weighing apparatus to the power supply as necessary to determine the weight of an item to be mailed and its appropriate postage value. The processing unit is responsive to a switch, or other such device, that detects the presence of an item to be mailed on the pan of the weighing apparatus, to initiate the computation of the appropriate postage values.

In another embodiment of the subject invention, the processing unit includes a processor, a first memory operatively connected to the processor for storing a program to control the processor and a second memory operatively connected to the processor for storing postal rate information. The second memory is connected to the power supply through a further processor controlled switch for selectively connecting and disconnecting the second memory as necessary to compute the appropriate postage value.

The subject invention advantageously supplies a scale having a reduced peak power demand wherein various subsystems of the scale are energized under processor control only as need to determine the appropriate postage value.

Other objects and advantages of the subject invention will be readily apparent to those skilled in the art from consideration of the detailed description set forth below and of the attached drawings.

DETAILED DESCRIPTION OF PREFERRED EMBODIMENTS OF THE INVENTION

Figure 1:
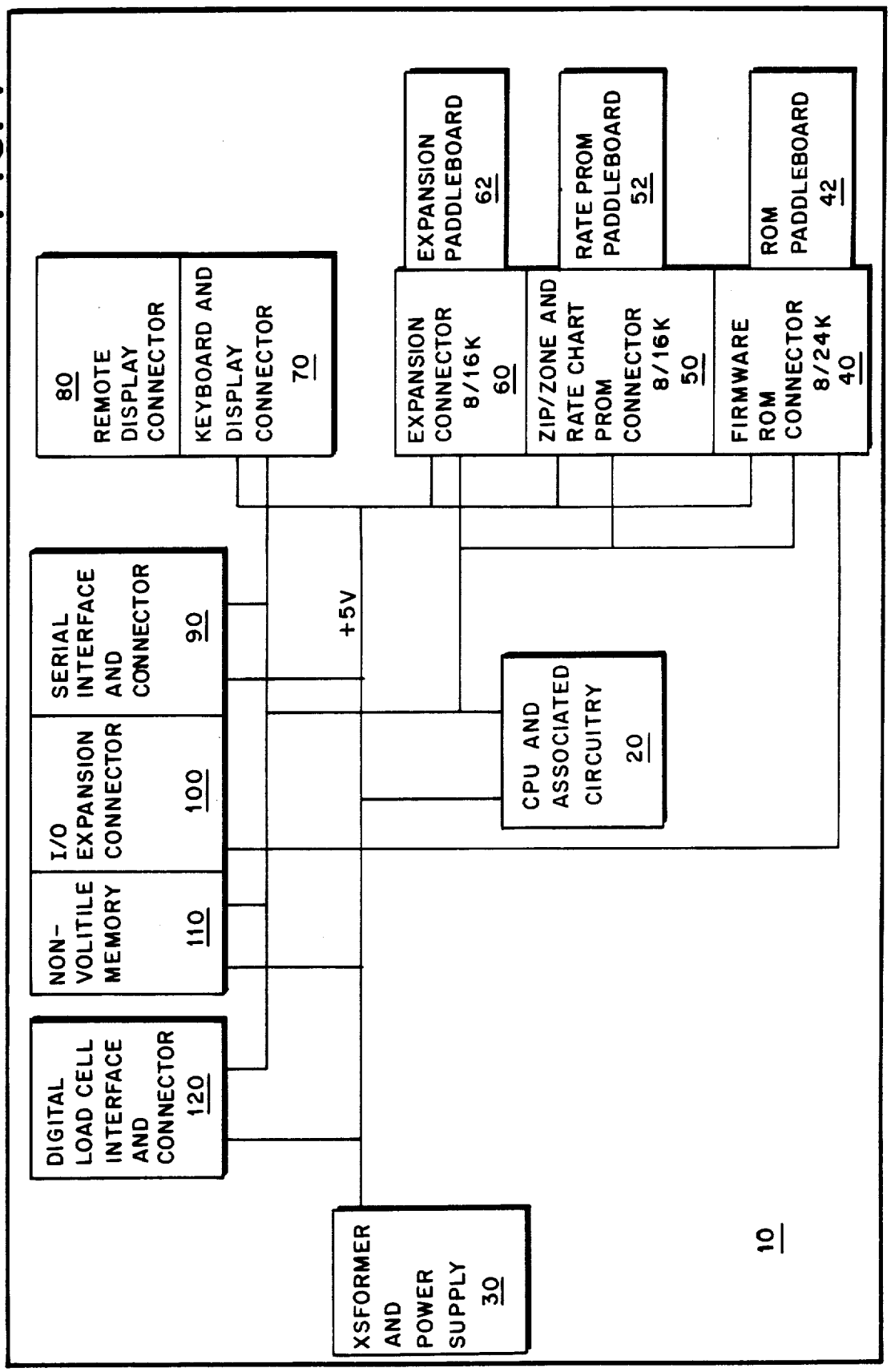
FIG. 1 shows a schematic block diagram of a computation and control module for use in postal scales and other mailroom equipment.

FIG. 1 shows a computation and control module for use in postage scales and other mailroom equipment, such as electronic accounting systems, in accordance with the subject invention. A large printed circuit board 10, commonly known as a "motherboard" supports the various components and connectors comprising the subject computation and control module. An integrated circuit microprocessor and its associated support circuitry are mounted on motherboard 10 to provide intelligence (i.e., programmable, general purpose computation and control capabilities) for the subject module. Such microprocessors are well know to those skilled in the art. Typical of such microprocessors is the well known Intel Model 8085, manufactured by the Intel Corp., Santa Clara, CA. Descriptions of the architectural structure of the 8085 and procedures for operationally connecting such microprocessors with various memory and input/output devices may be found in *MCS-80/85 Family User's Manual*, published by Intel Corp., 1979. Similar microprocessors and information are available from other manufacturers and are well known to those skilled in the art. Accordingly detailed description of the microprocessor, its associated circuitry and its interface to other components is unnecessary to an understanding of the subject invention and will not be discussed further.

Connectors 40, 50, 60 are connected to microprocessor 20 to allow the easy connection of memory modules to microprocessor 20 (the term "connector" as used herein is meant to include both single connectors or groups of connectors used together to perform a function. Similarly, paddle boards and other sub modules may comprise single units or groups of related units.) Connector 40 allows 8K to 24K bytes of read-only-memory (ROM) mounted on paddleboard 42 to be connected to microprocessor 20. This memory is used to store the firmware used to control the postal scale (or other item of postal equipment) comprising the subject module. Connector 50 allows 8K to 16K bytes of programmable-read-only-memory (PROM) mounted on paddleboard 52 to be connected to microprocessor 20. This memory is used to store postal rate charts and zip-to-zone information, which information is used to convert zip codes to postal zones for computing postage. (PROM's are preferred for storing postal rate data since such data is subject to fairly frequent change. However, those skilled in the art will recognize that, once programmed, PROM's and ROM's are functionally the same. Thus, hereinafter, while recognizing that either PROM's or ROM's may be used, "PROM's" will refer to postal rate and zip-to-zone memory while "ROM's" will refer to firmware memory). Connector 60 allows 8K to 16K of additional memory (ROM or PROM) to be connected to microprocessor 20 to provide an expansion capability for larger systems.

Connector 70 is provided to allow microprocessor 20 to communicate with a keyboard and display (not shown) to provide an operator interface. Connector 70 provides, as outputs, a serial data line, a serial clock line, 3 lines of encoded keyboard strobe signals, and a reset signal for clearing the display, all appropriately buffered; and 6 lines of keyboard return and an interrupt line as inputs. A +5 volt line and return are provided to supply power to the keyboard and display control logic. This arrangement allows up to 48 keys to be scanned by microprocessor 20 using a conventional strobe and return technique. The keys used will be defined (i.e., their meanings mapped) by information stored in PROM's 52 so that definitions of keys may be easily changed and an expanded keyboard may be used with the extended postal rate charts and zip-to-zone information used in more sophisticated models of postal scales. (Alternatively the keyboard may be defined by information stored in firmware ROM's 42).

In other mailroom equipment, such as electronic accounting systems, a more elaborate and extensive keyboard may be required. Such a keyboard and display would include a keyboard/display controller such as the model 8279 manufactured by the above identified Intel Corp. To allow for this expansion of keyboard capability the data line may be made bi-directional to communicate with the keyboard/display controller.

Preferably the display may be a conventional multielement flourescent display. High voltage and filament power may be supplied for the display either through connector 70 or locally at the display.

Remote display connector 80 parallels the display connections of connector 70; providing a data line, data clock and a +5 volt supply and return to allow for the provision of a remote display. The remote display would include its own controller and high voltage and filament supplies.

Connector 90 is provided to allow connection of the postal scale to a postage meter through a secure communications link. Since the operation of a postage meter is equivalent to the purchase of postage it is critical that the transmission of postage information from the postal scale to the meter be error free. A proprietary interface and protocol intended for such error free transmission of postal data to a postage meter is described in U.S. Pat. No. 4,301,507, for Electronic Postage Meter Having Plural Computing Systems to, Soderberg et al, issued Nov. 17, 1981, which is hereby incorporated by reference; and is known by the trade name Echoplex. Connector 90 provides an Echoplex serial data out line and return, a meter trip line, (which includes special protective circuitry to prevent the generation of false meter trip signals during power on/off transients) and return and a reset line as outputs. Inputs provided are an Echoplex serial data-in line, a return, and an interrupt line. A +5 volt line and return are provided to provide a remote reference level for signal detection, with return. Preferably the +5 volt line is short circuit protected.

Connector 90 also provides a unregulated +5 volt line which may be used to provide power to a two port interface expansion module mounted on a separate board. In more sophisticated scales such a board allows communication with a postage meter and with devices such as electronic accounting systems.

It should be noted that the Echoplex circuitry provided in the module of the subject embodiment does not include optoisolators but relies on the isolators of the connected postage meter. However the two port expansion board may preferably include a port with isolators for communication with devices such as electronic accounting systems which may not include isolators.

Connector 100 is provided to allow input/output expansion. A number of undefined lines are connected from firmware connector 40 to connector 100. This allows additional input/output circuitry to be mounted on ROM paddleboard 42. Thus, for example, a field upgrade of a postal scale to provide a printer output may be achieved simply by changing paddleboard 42; the substitute board would not only include firmware to control the printer but also input/output circuitry which would provide a printer port at connector 100. (Those skilled in the art will recognize that since microprocessors such as the 8085 use "memory mapped I/O"; where input/output registers are addressed as memory locations, input/output circuitry mounted on paddleboard 42 is directly accessable to microprocessor 20).

Non-volatile memory 110 comprises a small amount of memory such as electrically-erasable-programmable-read-only-memory ($E^2$PROM's). This memory is discussed separately from other memory since it is used to store data which is peculiar to particular scales. It is used to store information such as load cell calibration constants, (e.g., zero, correction factors) configuration parameters (e.g., meter in use, automatic set mode) and customer location zip code (for zip-to-zone conversion). Preferably this data will be stored with redundancy so that errors may be detected and, possibly, corrected. It is also preferred that the data be electrically alterable so that it may be changed or corrected through microprocessor 20.

Digital interface and connector 120 is provided to allow transmission of raw digital data from the load cell transducers, after conversion by the associated analog-to-digital converter (A/D). Details of the design of this interface would depend on the particular load cell and associated circuitry chosen for the load cell but would be well within the abilities of those skilled in the art. (Numerous patents including U.S. Pat. Nos. 4,139,892 and 4,350,216 show techniques for interfacing load cells to microprocessors). Having selected a particular interface design and protocol it would be routine for a person skilled in the art to adapt it to a product family of scales; essentially requiring only the provision of a sufficient number of data bits to allow the desired precision through the whole family of scales.

Preferably the load cell subsystem includes its own control processor. This would allow the load cell raw digital data, commonly known as counts, to be transmitted with error detection/correction redundancy (check sums, etc.) and two way communications; to check status, request retransmission in the event of an error, etc. Further incorporation of a microprocessor into the load cell subsystem would reduce the design of interface 130 to a routine processor to processor communications problem.

In use the function of the module of the subject invention would be controlled by the selection of ROM paddleboard 42, PROM paddleboard 52 and the information stored in non-volatile memory 110. For example, if the module of the subject invention were intended for use in a low range, unsophisticated scale with limited keyboard and display capabilities board 42 would be chosen lacking input/output circuitry and with ROM's programmed with firmware appropriate for the intended unsophisticated application. Board 62 would be selected with PROM's defining a limited selection of postal rates and defining a limited keyboard. In a very unsophisticated system zip-to-zone information might be entered through the keyboard. In such a system non-volatile memory 110 would only include load cell calibration constants and no zip-to-zone conversion tables would be provided.

In a more sophisticated system boards 42 and 52 would be selected to provide increased capabilities, zip-to-zone conversion, increased postal rate information, automatic meter setting, extended keyboard definitions, etc. In such a system non-volatile memory 110 would include calibration constants, configuration parameters and customer location zip code.

Programming for postal scales is disclosed in U.S. Pat. No. 4,286,325, to Dlugos, et al, for *System And Method For Computing Domestic And International Postage*, issued Aug. 25, 1981; and U.S. Pat. No. 4,325,440 to Crowley, et al, for *Method And System For Computing Special Fees In A Parcel Postage Metering System*, issued Apr. 20, 1982, which are hereby incorporated by reference. Such programming could readily be translated into firmware for a particular microprocessor by a person skilled in the art.

Further the module of the subject invention may also readily be used in mailroom systems such as electronic accounting systems, manifest systems, mailroom management systems or journal printers. (These systems are well known for use in mailrooms to record records of postal activity for later retrieval). For example, if the module of the subject invention where intended for use in a journal printer, board 42 would be selected to include journal printer firmware and printer I/O circuitry connected to expansion connector 100. Such a system might well require a full, general purpose keyboard and display and use the bi-directional serial communications provided through keyboard and display connector 70. Data would be received through serial interface 90; and in order to retain data for later retrieval random-access-memory would be provided on paddleboard 62, either through expansion connector 60 and/or by replacing PROM's on board 52.

Figure 2:
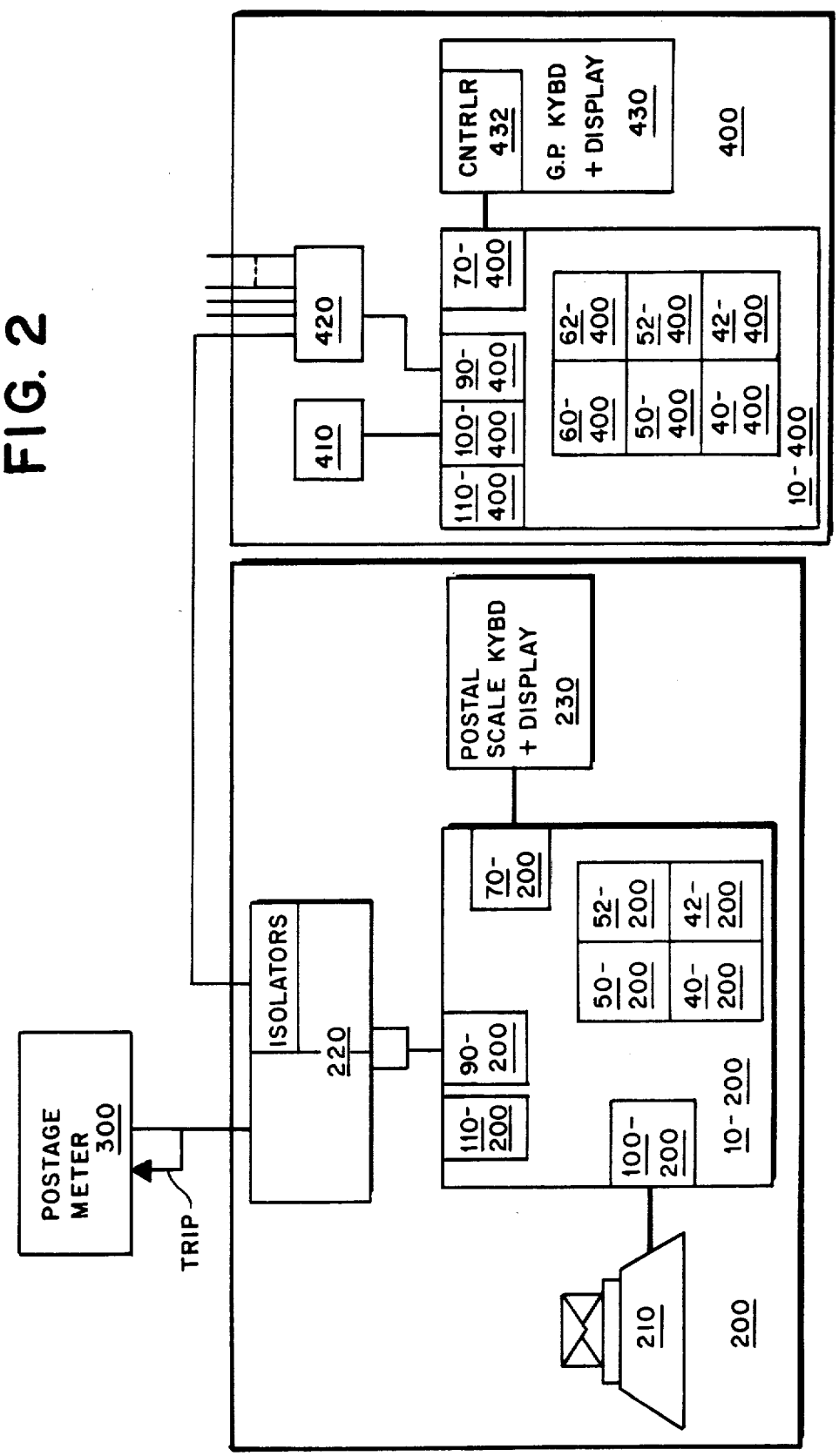
FIG. 2 shows a schematic block diagram of a mailroom system.

FIG. 2 shows a mailroom system comprising a postal scale 200, a conventional electronic postage meter 300 and an electronic system 400. Postal scale 200 comprises module 10-200 in accordance with the subject invention, a load cell subsystem 210 which provides count data for the item weighed through interface and connector 120-200, a port expander 220 connected to Echoplex port 90-200 and a specialized postal scale keyboard and display connected through connector 70-200. Board 42-200 provides firmware which controls module 10-200 in accordance with the desired capabilities. In addition to firmware for computing appropriate postage value in accordance with the weight of the item and postal information input through keyboard and display unit 230 board 42-200 also provides firmware for communications with other systems which may be connected to scale 200. Such communications firmware is selected by the processor (not shown) of module 10-200 in accordance with configuration parameters stored in non-volatile memory 110-200. In the system shown module 10-200 would communicate with a conventional postage meter 300, which may be a meter such as the Model 6500 meter manufactured by Pitney Bowes Inc., Stamford, Conn. and electronic system 400. In addition to transmitting postage values and trip signals to meter 300 module 10-200 also transmits postal information such as postage value, weight destination, zip code, etc. to electronic system 400.

Board 52-200 provides appropriate postal rate information and zip-to-zone information for scale 200, and also provides information defining the keys of keyboard display unit 230, which is read by a conventional strobe and return technique through connector 70-200.

System 400 may be any of a number of mailroom systems for logging postal data; such as, electronic accounting systems, journal printers, mailroom management systems, etc. Such systems also provide for later retrieval of the data either by printer, downloading to a disk, computer interface, or other means.

Figure 4:
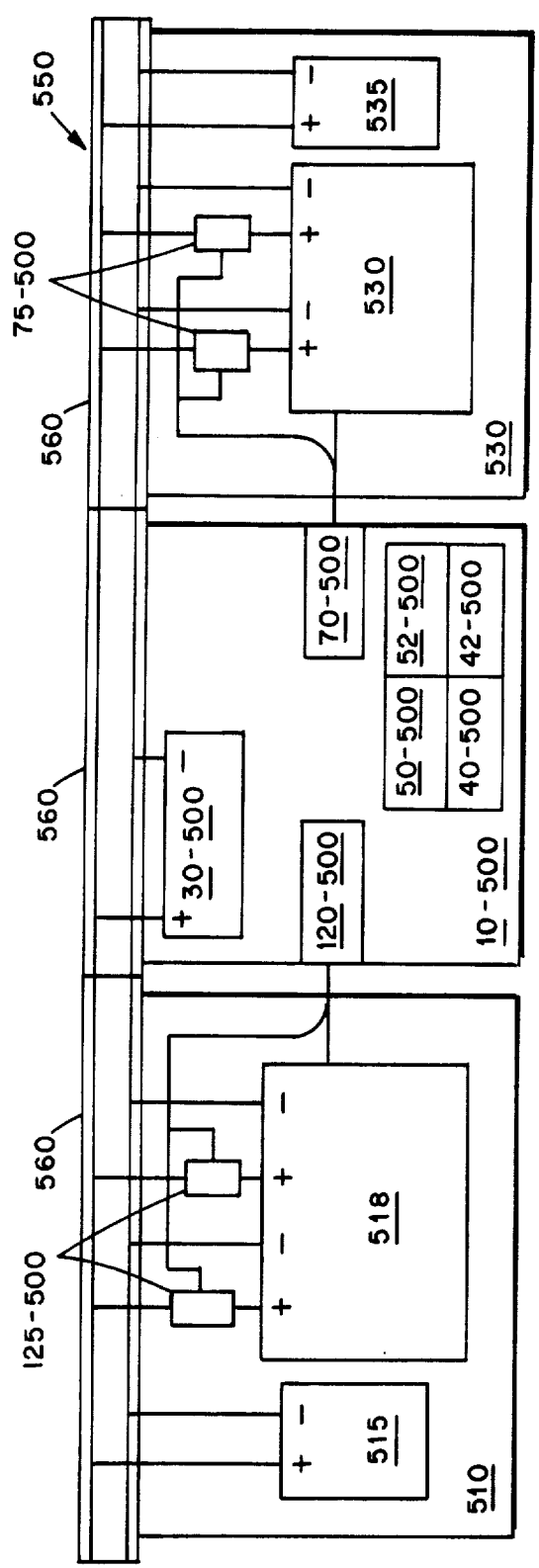
FIG. 4 shows a schematic block diagram of a modular, battery powered mailroom system.

Such a system is shown in FIG. 4 based on module 10-400, which is structurally identical to module 10-200. Board 42-400 provides firmware which defines the data logging and system control functions. Such programming would essentially involve no more than simple data base management and routine "housekeeping" functions for the system shown and would be well within the skill of those skilled in the art. Boards 52-400 and/or 62-400 would connect RAM memory to module 60-400. Such RAM storage may be used for temporary storage of logged postal data. (Design of connectors 50 and/or 60 to accept either ROM or RAM memory would be a routine task well within the capability of those skilled in the art.)

As described above scale 200 communicates with system 400 through Echoplex connector 90-200 and expander 220. System 40 also communicates through Echoplex connector 400 and may include expander 420 to allow communication with additional scales.

Device 410, which, as indicated above, may be a printer or other means for retrieving logged data, is connected to module 10-400 through connector 100-400 and appropriate interface circuitry on board 42-400.

Non-volatile memory 110-400 may contain configuration parameters such the number of scales connected to system 400, the particular model of printer connected, etc.

Because an operator may need to exercise greater control over system 400 it includes a general purpose keyboard and display unit 430 which further includes a control unit 432. Control unit 432 communicates with module 10-400 through the bi-directional data line of connector 70-400.

Because power supply 30 provides power to all the active components on motherboard 10 as well as other components attached to motherboard 10 it must be sized to support the largest system in which it may be used. Accordingly, to avoid burdening less sophisticated systems with the cost of an oversized power supply FIG. 3 shows an embodiment of the subject invention having a reduced power requirement.

Figure 3:
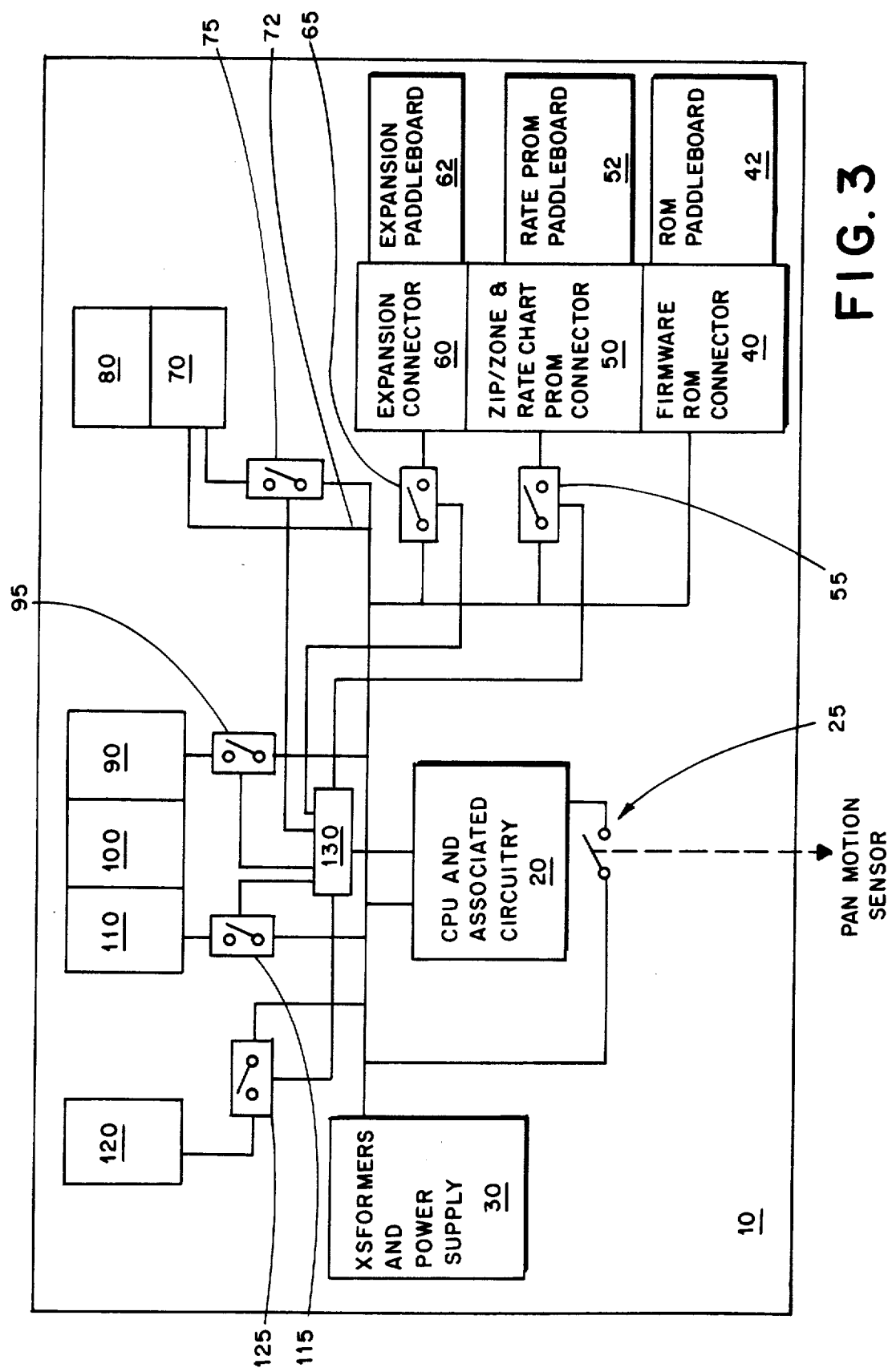
FIG. 3 shows a schematic block diagram of a computation and control module substantially similar to that shown in FIG. 1, which further shows power switching arrangements used to reduce power requirements.

FIG. 3 shows a module which is substantially the same functionally as the module shown in FIG. 1. (Note that the communications links between subsystems are the same but are not shown in FIG. 3 for ease of illustration). Normally open CMOS switches 55, 65 75, 95, 115 and 125 are connected in series with the +5 volt lines of connectors 50, 60, 70, 90, non-volatile memory 110 and connector 120, reducing the stand-by power drain on power supply 30. Switch assembly 25 connects the +5 volt source to an interrupt input of microprocessor 20 and is actuated, either mechanically, electro-optically, or in some other suitable manner, by motion of the scale pan (not shown). In response to the interrupt microprocessor 20 would command power control circuit 130 to close switch 125 to energize the load cell subsystem (not shown) and digital load cell interface 120, so that the weight counts from the load cell subassembly can be generated and transmitted. When a stable count input is received switch 125 is opened and switch 115 closed so that the parameters stored in non-volatile memory 110 may be retrieved. Switch 115 is then opened and switch 75 is closed so that the operator may enter the necessary information for the item to be mailed. (Note that preferably a separate, unswitched +5 volt source 72 is also provided to connector 80 to keep the keyboard of the keyboard/display unit (not shown) live so that operation of the scale may also be initiated from the keyboard). Switch 75 is then opened and switch 50 and, if necessary, switch 60 are closed to energize boards 52 and 62 so that necessary postal rate information and zip-to-zone conversion information may be retrieved. The appropriate postage value for the item to be mailed is then determined by microprocessor 20 and switches 55 and 65 are opened. If the configuration parameter information retrieved from non-volatile memory shows a postage meter connected switch 95 is closed to energize the Echoplex interface and connector 90 for transmission of the postage value information to such meter. Switch 75 is then opened and microprocessor 20 returns to a wait state until the next interrupt (or command from the keyboard).

Thus, the peak power demands on supply 30 are substantially reduced, allowing use of a smaller less costly supply. In less sophisticated systems, with low peak power requirements, power controller 130 may be omitted and switches 55, 65, 75, 95, 115 and 125 may be replaced, where necessary, with jumpers to reduce the cost of the module and to simplify the firmware.

In another embodiment of the subject invention the ROM's and PROM's of boards 42, 52 and 62 may be replaced with battery powered memory modules. Such modules are disclosed in commonly assigned U.S. patent application Ser. No. 590,670, for Postal Rate Memory Module with Integral Battery Power, by Flavio Manduley, filed Mar. 19, 1984, which is hereby incorporated by reference. By incorporating battery power on boards 43, 52 and 62 additional memory may be added for more sophisticated systems without need for a larger power supply. Further, incorporating battery power on boards allows preprogrammed RAM's to be shipped to users for postal rate updates, etc. and the use of only RAM memory with the module of the subject invention simplifies it use in application such as journal printers and electronic accounting systems where RAM storage is needed.

With the availability of low power CMOS logic and low power displays it is possible to extend the idea of battery powered modules to encompass entire battery powered modular systems. Such a system is shown in FIG. 4. A module in accordance with the subject invention 10-500 comprises battery powered paddleboards, 42-500 and 52-500, a battery power supply 30-500, and incorporates low power CMOS circuitry for active components. A load cell, or other pressure transducer, subsystem 510 utilizing low power circuitry 518 for amplifiers and A/D's is connected to module 10-500 through connector 120-500 and a low power keyboard and display subsystem 530 is connected through connector 70-500. Suitable low power load cell subsystems are known in the art and include low power modular load cells manufactured by the Toledo Scale Division of Reliance Electric Co., Worthington, Ohio, capacitance transducers manufactured by Serta Corp., Massachusetts, and Digital Mass Transducers manufactured by K-Tron, Arizona Corp., Scottsdale, Ariz. Similarly low power displays and keyboards are available, ranging up to the typewriter type keyboard and multiline display used in the current generation of "laptop" computers.

Each subsystem includes its own battery power supply 515 and 535; again so that battery 30-500 need not be sized to supply the largest system contemplated.

Batteries 30-500, 515 and 535 are interconnected by a low impedance external power bus 550 to reduce noise problems and also to mechanically interconnect the subsystems.

Figure 5:
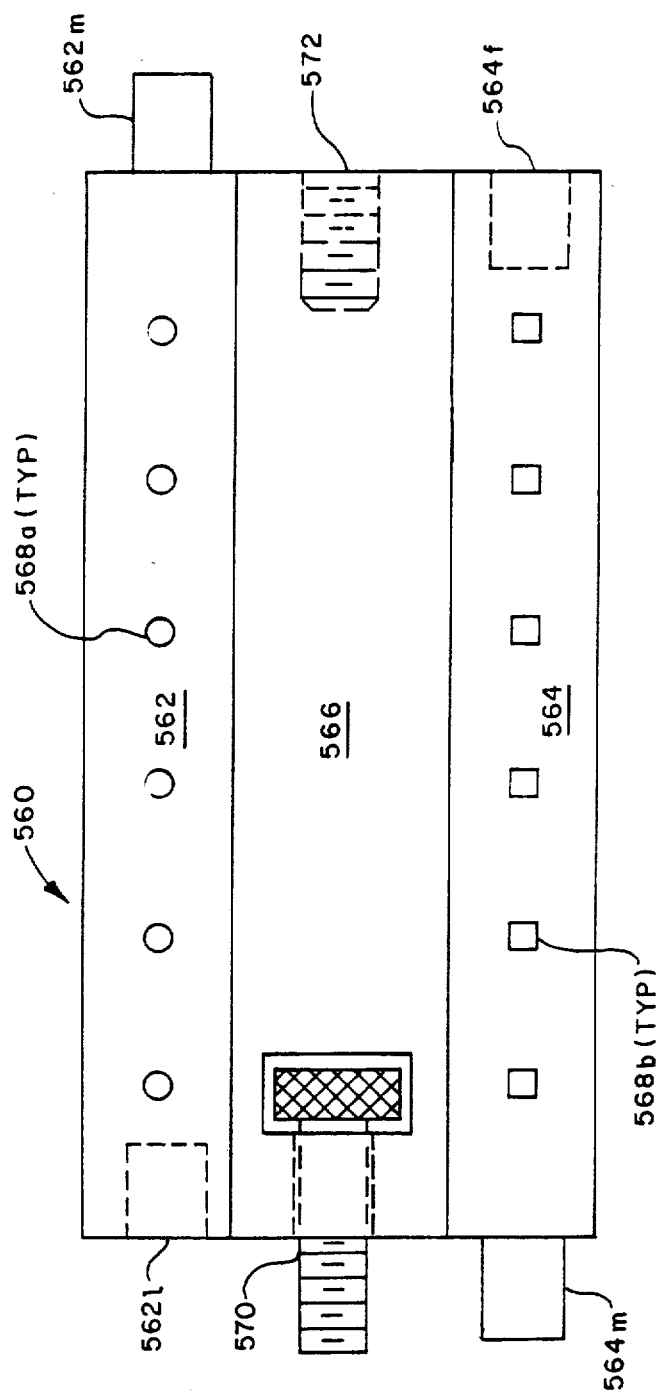
FIG. 5 shows a plan view of a power bus module.

Bus 550 is formed from a plurality of substantially identical segments 560, shown in FIG. 5. Segment 560 comprises two substantial, low impedance conductors 562 and 564; for +5 volts and ground respectively. Conductors 562, 564 are held in parallel, fixed relationship by substantially rigid separator 566. Spaced along conductors 562 and 564 are polarized sockets 568a and 568b into which various battery powered subsystems may be plugged. The sockets are spaced closely enough that multiple connections may be made by each subsystem in order to minimize noise problems.

The ends 562m, 562f, 564m and 564f are shaped to mate with the corresponding ends of similar segments 560. At one end of separator 566 a captive thumbscrew 570 is mounted and a corresponding tapped bore 572 is provided at the other end so that a low impedance mechanically strong bus system may be formed by screwing together a plurality of segments 566. Mechanical and power connections between the subsystems of a battery power system such as that shown in FIG. 4 are made by plugging the subsystems into the bus so formed.

Returning to FIG. 4 the power drain on batteries 30-500, 515 and 535 may be further reduced by provision of switches 25,500 and 125-50 to sequentially connect subsystems as required; substantially in the same manner as described above with respect to the embodiment of FIG. 2.

The embodiments of the subject invention described above and shown in the attached drawings have been given by way of illustration only. Those skilled in the art will recognize numerous other embodiments within the scope of the subject invention.

What is claimed is:

1. A postal scale comprising:
   (a) processing means for controlling the operation of said scale and for computing appropriate postage values in accordance with the weight of an item to be mailed and postal information entered by an operator, said processing means being controlled by a stored program;
   (b) input means for transmission by said operator of said postal information to said processing means;
   (c) weighing means for determining the weight of said item to be mailed, for converting said weight to digital form, and for transmitting said digitized weight to said processing means;
   (d) a power supply for supplying power to said processing means, said input means and said weighing means;
   (e) power switching means, responsive to said processing means, for selectively connecting said input means and said weighing means to said power supply as necessary to determine said weight and compute said postage values and then disconnecting said means, so as to reduce power requirements; and,
   (f) sensing means for detecting the presence of an item to be mailed on said weighing means and, in response, initiate the determination of the appropriate postage for said item by said processing means.

2. A postal scale as described in claim 1 wherein said processing means further comprises:
   (a) a processor for controlling the operation of said scale and for computing said appropriate postage values in accordance with a predetermined program;
   (b) first memory means connected to said processor for storing said program;
   (c) second memory means connected to said processor for storing postal rate information;
   (d) second power switching means, responsive to said processor, for selectively connecting said second memory means to said power supply as necessary to compute said postage values and then disconnecting said memory means so as to reduce power requirements.

3. A postal scale as described in claim 2 wherein said power supply comprises a battery.

4. A postal scale as described in claim 3 wherein said processing means, said input means, and said weighing means each form a modular subsystem.

5. A postal scale as described in claim 2 wherein said processing means, said input means, and said weighing means each form a modular subsystem.

6. A postal scale as described in claim 5 wherein each of said modular subsystems further comprises a battery connected to a common power bus.

7. A postal scale as described in claim 1 wherein said power supply comprises a battery.

8. A postal scale as described in claim 7 wherein said processing means, said input means, and said weighing means each form a modular subsystem.

9. A postal scale as described in claim 1 wherein said processing means, said input means, and said weighing means each form a modular subsystem.

10. A postal scale as described in claim 9 wherein each of said modular subsystems further comprises a battery connected to a common power bus.

11. A postal scale as described in claim 1 further comprising a general purpose module, said module comprising:
    (a) said processing means
    (b) a power supply
    (c) first connector means for connecting signals from said weighing means to said processing means and for connecting said power supply to said weighing means;
    (d) second connector means for connecting signals from said input means to said processing means and for connecting said power supply to said input means; and
    (e) said switching means.

12. A postal scale as described in claim 11 wherein said processing means further comprises:
    (a) a processor for controlling the operation of said scale and for computing said appropriate postage values in accordance with a predetermined program;
    (b) first memory means connected to said processor for storing said program;
    (c) second memory means connected to said processor for storing postal rate information;
    (d) second power switching means, responsive to said processor, for selectively connecting said second memory means to said power supply for periods necessary to compute said postage value and then disconnecting said memory means so as to reduce power requirements.

13. A postal scale as described in claim 12 wherein said processing means, said input means, and said weighing means each form a modular subsystem.

* * * * *